(12) United States Patent
Lim et al.

(10) Patent No.: US 10,635,173 B2
(45) Date of Patent: Apr. 28, 2020

(54) SMART RING PROVIDING MULTI-MODE CONTROL IN A PERSONAL AREA NETWORK

(71) Applicant: MOTOROLA SOLUTIONS, INC., Chicago, IL (US)

(72) Inventors: Bing Qin Lim, Jelutong (MY); Chong Keat Chua, Ayer Itam (MY); Wai Kuen Goh, Bentong (MY); Khay Loon Heng, Paya Terubong (MY); Wooi Ping Teoh, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/308,610

(22) PCT Filed: Aug. 8, 2016

(86) PCT No.: PCT/MY2016/000047
§ 371 (c)(1),
(2) Date: Dec. 10, 2018

(87) PCT Pub. No.: WO2018/030887
PCT Pub. Date: Feb. 15, 2018

(65) Prior Publication Data
US 2019/0155385 A1    May 23, 2019

(51) Int. Cl.
*G06F 3/01* (2006.01)
*H04W 4/80* (2018.01)
(Continued)

(52) U.S. Cl.
CPC .............. *G06F 3/014* (2013.01); *G06F 3/033* (2013.01); *H04L 63/0861* (2013.01);
(Continued)

(58) Field of Classification Search
CPC .......... G06F 3/014; G06F 3/033; H04W 4/80; H04W 4/10; H04L 63/0861; H04M 1/7253
(Continued)

(56) References Cited

U.S. PATENT DOCUMENTS 9,880,620 B2 * 1/2018 Kienzle ................... G06F 3/014
10,043,125 B2 * 8/2018 Park ...................... G06F 3/04883
(Continued)

FOREIGN PATENT DOCUMENTS

| EP | 2981052 A1 | 2/2016 |
| WO | 2009024971 A2 | 2/2009 |
| WO | 2015153803 A1 | 10/2015 |

OTHER PUBLICATIONS

Gloriast: "Concept iRING Controls Your iPOD", http://itechfuture.com/concept-iring-controls-your-ipod/, Apr. 13, 2012, downloaded from Internet: Nov. 27, 2018, all pages.
(Continued)

*Primary Examiner* — Brian K Young
(74) *Attorney, Agent, or Firm* — Barbara R. Doutre

(57) ABSTRACT

A smart ring (100) provides multi-mode control in a personal area network (PAN). The smart ring has a fingerprint sensor (106) for identifying upon which finger and which finger segment the smart ring is being worn. A controller (902) of the smart ring (100) enables a predetermined PAN device and PAN control function in response to identified finger and finger segment information (1, 2, 3) matching pre-stored fingerprint information. One of the PAN devices is thus selectively enabled and a predetermined function is controlled, based on identification of the finger and finger segment location of the smart ring (100). Several different PAN devices (narrowband radio, body-worn camera, sensors, gun holster, remote speaker microphone, broadband device, to name a few) can be selectively controlled and varied via rotation of the smart ring (100), making the smart ring well suited for public safety applications.

24 Claims, 6 Drawing Sheets

(51) Int. Cl.
H04L 29/06 (2006.01)
H04W 4/10 (2009.01)
G06F 3/033 (2013.01)
H04M 1/725 (2006.01)

(52) U.S. Cl.
CPC .............. *H04W 4/10* (2013.01); *H04W 4/80* (2018.02); *G06F 2203/0331* (2013.01); *G06F 2203/0336* (2013.01); *H04M 1/7253* (2013.01)

(58) Field of Classification Search
USPC .................................................. 341/2, 6, 17
See application file for complete search history.

(56) References Cited

U.S. PATENT DOCUMENTS

| | | | | |
|---|---|---|---|---|
| 2012/0075196 | A1* | 3/2012 | Ashbrook | G06F 3/014 345/173 |
| 2015/0277559 | A1 | 10/2015 | Vescovi et al. | |

OTHER PUBLICATIONS

Bluetooth PTT & Mic Ring, Guangzhou ComArt Communications Equipment, http://www.comart.com.cn/show_pro_en.asp?classid=134, update time: Dec. 18, 2013, downloaded from internet: Nov. 27, 2018, all pages.
Bluetooth PTT with two programmable keys, POA47, Audio, Hytera, http://www.hytera.us/Catalogs/Accessories.aspx?ID=POA47, copyright 2018, downloaded from the Internet: Nov. 27, 2018, all pages.
Fin: Wearable Ring, Indiegogo, https://www.indiegogo.com/projects/fin-wearable-ring#/, downloaded from internet: Nov. 27, 2018, all pages.
Fin—A wearable Gesture Controlled Ring, published Oct. 22, 2014, http://www.slideshare.net/ganeshjha338/fin-ring, downloaded from the Internet: Nov. 27, 2018, all pages.
Jordan, Sam: "Nod Gesture Control Ring", posted in Tech, HI Consumption, http://hiconsumption.com/2014/05/nod-gesture-control-ring/, downloaded from internet: Nov. 27, 2018, all pages.
Purcher, Jack: "Microsoft Invents a Smart Ring Mobile Device Controller that could double as a Virtual Mouse", 5C. Non-Apple News—Patently Xtra, Apr. 3, 2016, http://www.patentlyapple.com/patently-apple/2016/04/microsoft-invents-a-smart-ring-mobile-device-controller-that-could-double-as-a-virtual-mouse.html, downloaded from Internet: Nov. 27, 2018, all pages.
Jakcom R3F NFC Smart Ring Compatible with Smartphones of Android/WP Systems having NFC Function IP68 Waterproof Dustproof Shockproof (Black), https://www.amazon.com/Jakcom-R3F-Compatible-Smartphones-Waterproof/dp/B01N1IGUQJ, downloaded from the Internet: Nov. 28, 2018, all pages.
Counting Ring, anillo para contar dinero, https://www.taringa.net/+noticias/counting-ring-anillo-para-contar-dinero_12qrv4 downloaded from the Internet: Nov. 28, 2018, all pages.
Topcu, Berkay et al: "Fingerprint Matching Utilizing Non-Distal Phalanges", 21st International Conference on Pattern Recognition (ICPR 2012) Nov. 11-15, 2012, Tsukuba, Japan all pages.
The International Search Report and the Written Opinion corresponding serial No. PCT/MY2016/000047 filed Aug. 8, 2016, all pages.

* cited by examiner

SMART RING PROVIDING MULTI-MODE CONTROL IN A PERSONAL AREA NETWORK

FIELD OF THE DISCLOSURE

The present invention relates to communication systems, and more particularly to a device for controlling multiple modes and functions within personal area network (PAN).

BACKGROUND

When operating a communication system in a public safety environment, the ability for a user to control more than one device and/or more than one control function per device is highly desirable. In today's public safety environment, a portable, body-worn, communication system may utilize a portable two-way radio, in conjunction with a radio accessory device, such as a remote speaker microphone (RMS), headset, and the like. While a radio accessory device may be coupled to the radio via a wired or wireless interconnect, the ability to add on accessories and switch control between radio accessories becomes limited and complex. Attempting to manage additional wireless electronic devices, such as a photo/video camera, an electronic notepad, a cell phone and the like, which may be body-worn, mounted to a vehicle dashboard, and/or mounted to bicycle handle bars, during the course of public safety operations can become cumbersome.

Approaches that have been used in the past to manage or track devices include capacitive touch sensing, gyroscopes, accelerometers, and gesture control, but all these approaches tend to have issues with false triggering and limited functionality.

Accordingly, it would be beneficial to have a device and system that facilitates multi-mode control of devices and the various functions of those devices operating within a communication environment, such as a public safety environment. A device that identifies authorized users and ties this identification into the operation of the device would provide additional security to public safety systems.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
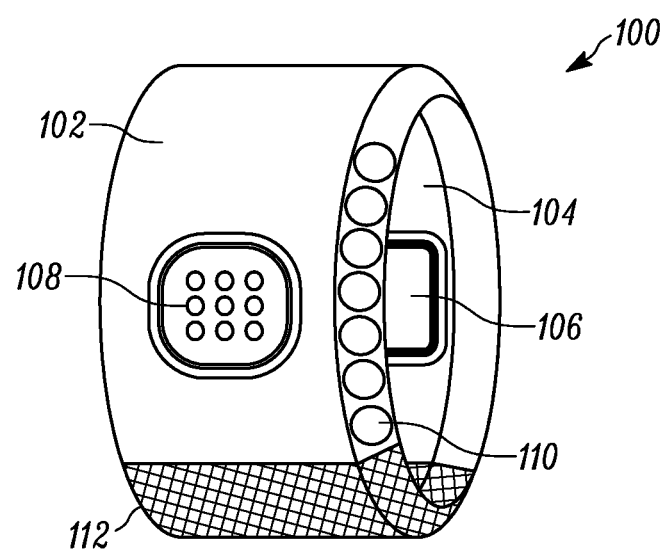
FIG. 1 shows a personal area network (PAN) control device embodied as a smart ring formed and operating in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a portable electronic device in the form of a wearable smart ring that provides the ability for a user to selectively control one or more electronic devices and/or more control functions per device in a communication system, for example a portable communication system formed of a plurality of body-worn devices operating within a public safety environment. Other communication devices operating within the system may be for example, dash-mounted devices, handlebar mounted devices, or a combination thereof. The smart ring to be described through the various embodiments provides user authentication via fingerprint scan. Upon authentication of fingerprints with pre-stored prints in memory, the smart ring enables a control function of one of the devices within the system. Sliding of the ring from finger segment location to finger segment location enables different functions. Where applicable, the smart ring further provides variable control of the enabled function via rotation of the ring. The smart ring thus advantageously allows for one device to manage the control of a plurality of functions of different devices by moving the device from finger to finger, sliding the ring from segment to segment and rotation of the ring. The smart ring is beneficial in public safety environments where for example, an officer be working undercover require discretion in the manipulation of controls of various accessory devices which are worn on or near the body.

FIG. 1 is a personal area network (PAN) control device embodied as a smart ring 100 formed and operating in accordance with the various embodiments. Smart ring 100 is a body wearable, battery operated PAN control device for wearing on any one of a user's fingers. In accordance with the various embodiments, smart ring 100 has an exterior surface 102 and an interior surface 104, wherein the interior surface 104 further comprises a fingerprint sensor 106 integrated therein for identifying upon which finger and which finger segment the smart ring is being worn, and in accordance with further embodiments determines rotation of the ring together with direction of the rotation. The fingerprint sensor 106 may comprise for example integrated fingerprint sensor, image sensor, infrared sensor, finger vein pattern recognition sensor, camera, or scanner, known in the art, and therefore not discussed in further detail. The smart ring 106 is powered on automatically upon being placed on a user's finger via the fingerprint sensor 106. In accordance with the various embodiments, the smart ring 100 automatically scans a portion of the finger upon which it is placed. The prints held in the ring's memory contain prints taken along all portions of a finger, such that a scan taken, for example, by smart ring 100 at a smaller portion of a side segment of an authorized user's finger will be matched to a corresponding portion stored in the database.

In accordance with the various embodiments, the wearable smart ring 100 is formed of an annular member defining an aperture adjustably sized via a flexible portion 112 formed of an adjustable elastic material or other suitable conformable material which adjusts to allow the smart ring to be worn on any finger. The stretch portion 112 further facilitates the ability to align the fingerprint sensor 106 against the skin at any location along a finger. The stretch portion 112 further facilitates the ability rotate the smart ring 100 by simple manipulation of the stretch material and rotational movement of the smart ring 100. In accordance with some embodiments, the smart ring 100 may further comprise light emitting diode(s), LEDs 110 indicative of various functions. In accordance with some embodiments, the smart ring 100 may instruct any PAN device operating within a network such as, a radio, a head mounted display (HMD), an earphone, to name a few, through PAN connectivity, to generate a status indication tone or voice announcement according to the action performed on the ring and worn position of the ring.

The fingerprint sensor 106 is coupled to a controller and memory located within the smart ring 100 (shown and described later in conjunction with FIG. 9). In accordance with various embodiments, the memory stores a library database of identified authorized users and predetermined devices based on pre-stored fingerprint scans, and information pertaining to predetermined finger segments, such as predetermined control functions. In accordance with the various embodiments, the smart ring 100, via the controller, enables a predetermined PAN control function in response to the fingerprint sensor 106 generating an identified finger and finger segment match with the pre-stored fingerprint information stored in memory. For example, upon proper authorization being verified via the fingerprint scan, the smart ring 100 may enable a radio mode, and now have control of a predetermined function of a radio, located on or about the user, such as a push-to-talk (PTT) function, using a button 108 of the smart ring.

In some embodiments the control function is a variable control function, and the smart ring 100 can further provide control of the variable control, by rotation of the smart ring 100, for example rotation of smart ring 100. The LEDs 110 may also be used to facilitate viewing of variable changes in such a control. In accordance with some embodiments, the PAN control function may be a variable function in which sliding the smart ring to different segment locations along the finger can change the variation in control. In accordance with some other embodiments, the PAN control function is a variable function and both sliding and rotation of the smart ring provide expanded variable control, wherein rotation of the smart ring controls the variation in control and sliding of the smart ring to a different segment expands the variation in control as will be further described in conjunction with FIG. 7.

The smart ring 100 with fingerprint sensor 106 integrated at the interior surface 104 is able to identify ring position. For the purposes of this application ring position will be referred to as identifying of the finger upon which the ring is being worn (thumb, index finger, middle finger, ring finger, little finger) and finger segment upon which the ring is being worn: first segment (closest to the palm) (proximal phalanges), second segment (intermediate phalanges), and third segment (distal phalanges), where applicable. Even a fourth segment may be applicable for user's who are double jointed or have particularly long fingers. The smart ring with fingerprint sensor 106 is further able to detect ring rotation and longitudinal sliding of the ring along the finger from finger segment to finger segment. The stored scans include information pertaining to rotation and sliding motion so that these movements are recognized and associated with control functions.

In accordance with the various embodiments, the smart ring 100 provides finger identification and location/segment information for each thumb, index finger, middle finger, fourth finger, and outer finger of one or both hands for pre-authorized users stored therein. Each finger identification is associated with a predetermined device and each location/segment is associated with a predetermined function.

Figure 2:
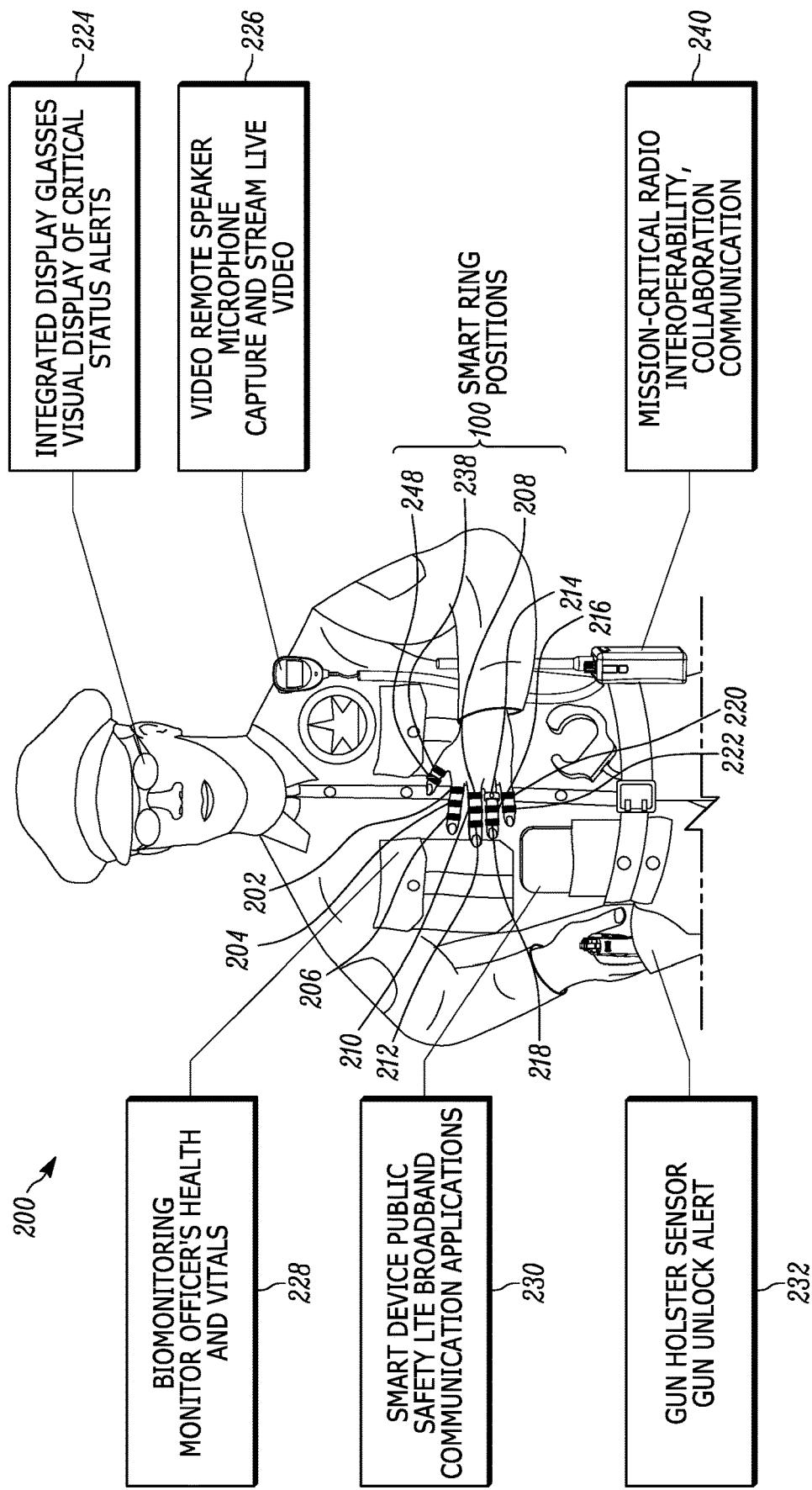
FIG. 2 is a communication system comprising a plurality of communication devices that can be selectively controlled within a PAN network by the smart ring 100 of FIG. 1 in accordance with various embodiments.

FIG. 2 is a portable communication system 200 formed in accordance with various embodiments. Communication system 200 comprises a plurality of body-wearable communication devices 224, 226, 228, 230, 232, 234, 240 that can be selectively controlled within a PAN network, by the smart ring 100 of FIG. 1. In accordance with various embodiments, smart ring 100 is interchangeable from finger to finger to enable an operating mode of one or more of the plurality of PAN capable devices. In accordance with various embodiments, smart ring 100 can be rotated to provide variable control of an enabled function, where applicable. In accordance with further embodiments, smart ring 100, can be slid from one finger segment to another finger segment to enable a different control function of the enabled control mode.

While shown as body-worn devices in FIG. 2, other devices, such as dash mounted PAN devices in a vehicle, handlebar mounted PAN devices, or a combination thereof may also form part of communication system 200. In accordance with the various embodiments, smart ring 100 facilitates multi-mode control of a plurality of device operating in a PAN.

The plurality of PAN devices 224, 226, 228, 230, 232, 234, 240 are shown as examples and may comprise, but are not limited to, display glasses 224, video remote speaker microphone (VRSM) 226, a bio-monitoring device 228, a smart phone broadband device 230, a smart gun holster 232, and a radio 24. Some of the PAN devices may interoperate with the other PAN devices and may also operate within other networks. For example, the radio 240, may be a land mobile mission critical radio providing interoperability, collaboration and communication with the other on-body PAN devices and/or other network devices (for example VAN, LMR network, base station, broadband, LTE). In accordance with the various embodiments, smart ring 100 is worn by a user, such as a police officer or other public safety personnel, to allow the user to easily enable different operating modes and control functions associated with these devices operating over a wireless PAN.

The smart ring 100, via the interior side sensor 106, provides for the detection of thumb, index finger, middle finger, ring finger and little finger of authorized users to enable control of different PAN devices of the plurality of PAN devices. The smart ring 100, via the interior side sensor 106, senses each finger segment of each thumb, index finger, middle finger, ring finger and little finger and is further able to provide variable control via rotation where applicable.

In some applications, the smart ring 100 may initially have a single finger location and fingerprint segment information stored therein and then have additional devices added-on as desired. So, at least one of: thumb, index finger, middle finger, ring finger, and outer/little finger of one or both hands of pre-authorized user finger location and fingerprint segment information is stored within smart ring 100. The smart ring 100 may thus control different functions of one device using different segments. Alternatively, the smart ring 100 may have the fingerprint segments along the single finger assigned to control different devices.

For the smart ring controlling different functions using different segments of one finger embodiment, when the user decides to add-on devices, the smart ring 106 can be updated via fingerprint sensor 106 with finger and finger segment information along with assignment to the added device and control function(s).

Upon placement of the smart ring 100 on the user's, the fingerprint sensor 106 (of FIG. 1) scans a portion of the user's finger and compares those prints to pre-stored fingerprints stored in the ring's memory. The memory provides a database library of pre-stored fingerprints of authorized users. These pre-stored fingerprints represent authorized identification and smart ring position(s) for assigned devices with predetermined specific control functions for each device. Upon an authorized match of finger identification, the user's authorized identification and smart ring position(s) identifies the pre-stored devices and control functions associated with an authorized user of the smart ring 100. Further control of the identified PAN device is achieved via the rotation and sliding of the smart ring 100. In some embodiments, the first segment of each finger can be set as a "Home" function, where only the physical button 108 is functioning and no rotation function is assigned to the first segment to prevent false triggering of a rotation function.

Smart Ring on Ring Finger:

In communication system 200, in response to an appropriate scan match on the user's ring finger, the smart ring 100 selectively enables a predetermined device associated with that ring finger for that user, such as in this example display glasses 224, and predetermined control functions based on position location of the ring on the finger. For example, smart ring 100: when located at segment 1, controls critical status alerts, 214, at when located at segment 2, controls select contact phone calls, 216; and when located at segment 3, controls select messages/view messages, 218. Thus, smart ring 100 is able to control functions of the display glasses 224 over the PAN network.

Smart Ring on Middle Finger:

In response to an appropriate scan match on the user's middle finger, the smart ring 100 selectively enables a predetermined device associated with that user's middle finger, such as in this embodiment, video remote speaker microphone (VRSM) 226. The specific pre-stored functions for the video remote speaker microphone (VRSM) 226 in this example embodiment capture and stream live video functions using the middle finger positioning. For communication system 200, the smart ring 100 being located on the middle finger allows the ring to operate in a VRSM mode in which to control certain predetermined control functions of VRSM device 226. For example smart ring 100: when located at segment 1, controls camera function, 208; when located at segment 2, controls video/zoom function, 210; and when located at segment 3, controls photo/zoom function, 212. Rotation provides additional control of functions which are variable functions, such as zoom functions.

Smart Ring on Thumb Finger:

In response to an appropriate scan match on the user's thumb, the smart ring 100 selectively enables a predetermined device associated with that thumb finger, such as in this embodiment, the bio-monitoring device 228. The specific pre-stored functions for the bio-monitoring device 228 control monitoring the officer's health and vital signs using the smart ring 100 at predetermined thumb positions. For example, smart ring 100: when located at segment 1, controls vital sign selection function, 238; and when located at segment 2, controls activation/deactivation function, 248.

Smart Ring on Index Finger:

In response to an appropriate scan match on the user's index finger, the smart ring 100 enables control of an operating mode of the radio broadband device 240, so as to control predetermined functions. For example smart ring 100 located at: segment 1, controls PTT function, 202; smart ring 100 located at segment 2, controls volume function, 204; and smart ring located at segment 3, controls channel selection function, 206.

Smart Ring on Little Finger:

In response to an appropriate scan match of the user's little finger to pre-stored scans stored in memory, the smart ring 100 enables control of a smart gun holster 232. A predetermined function of the gun holster 232 can now be controlled by the smart ring 100. For example, segment 1, enables an electronic holster lock/unlock function, 220; and segment 2, controls an unlock alert function, 222.

By way of non-limiting examples, the multi-control provided by smart ring 100 for communication system 200 is summarized in the Table below:

| Finger | Device | Segment 1 | Segment 2 | Segment 3 |
| --- | --- | --- | --- | --- |
| Thumb | Bio-monitor Sensor 228 | Vital sign selection 238 | Activation/ Deactivation 248 | N/A |
| Index finger | Radio 240 | Home (PTT) 202 | Volume Adjust 204 | Channel Selection 206 |
| Middle finger | VRSM 226 | Home (Camera) 208 | Take Video. Zooming 210 | Take Photo Zooming 212 |
| Ring finger | Display Glasses 224 | Home (Display Glasses) 214 | Select Contacts Phone Call 216 | Select Messages. View Message 218 |
| Little finger | Smart Holster 232 | Home (Holster) 220 | Activate Unlock Alert 222 | N/A |

In accordance with the various embodiments, many other devices and combinations are well within the scope of the embodiments, some of which are further discussed herein.

Figure 3:
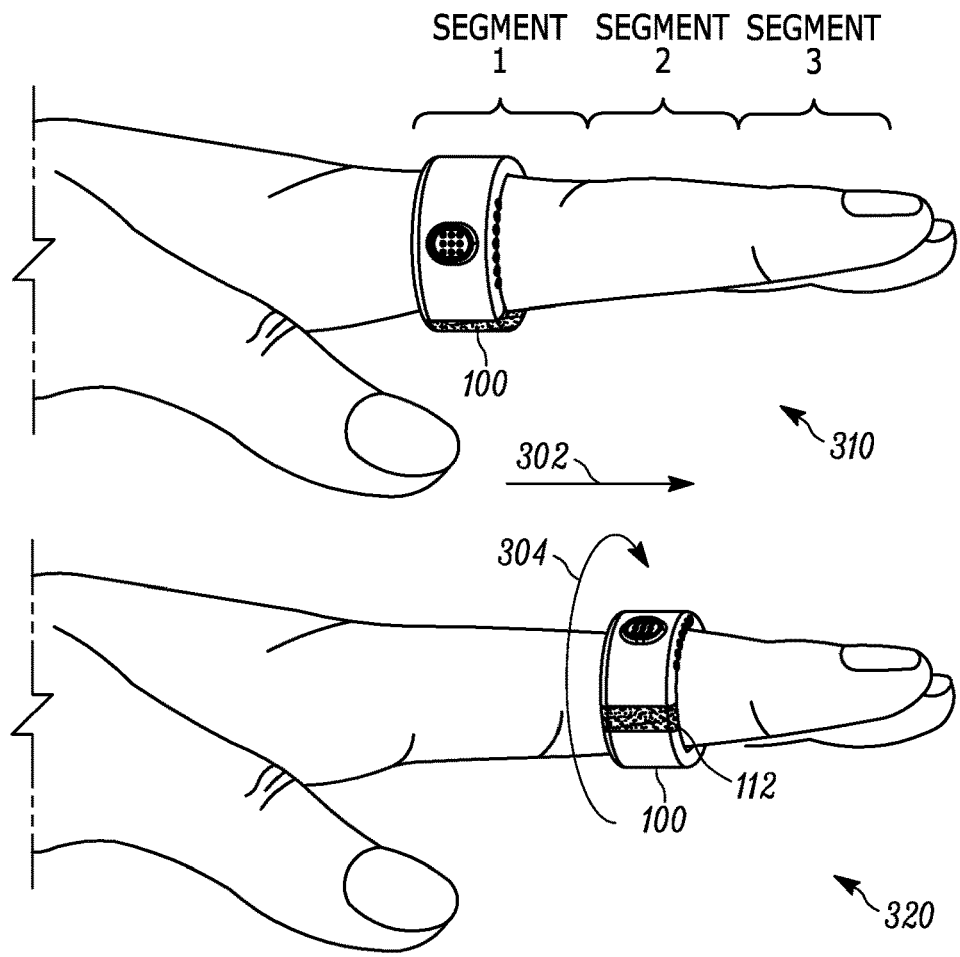
FIG. 3 shows the smart ring of FIG. 1 operating in accordance with some various embodiments.

FIG. 3 shows the smart ring operating in accordance with some embodiments. In view 310 the smart ring 100 is shown at a first segment 1 (Segment 1), thereby enabling a first function. By moving, sliding 302 to segment 2, a second function can be enabled. The smart ring 100 can also be rotated 304 at the segment 2 location, for control functions which have variable applications, such as volume and channel change.

The flexible elastic portion 112 of smart ring 100 allows for the user to easily slide and comfortably position the smart ring 100 from segment position to segment position along the finger. The segment positions are naturally formed between the knuckles of a user's fingers, so that a user can easily determine placement. The pre-stored scans include scans of an entire finger and several segment variations and thus accommodate for many tolerance variations along the segmented versions as well as around the circumference of the finger.

Accordingly, in accordance with the various embodiments, smart ring 100 having fingerprint sensor 106 integrated at inner surface 104 is able to identify: ring position (identify different finger & finger segment where ring located); and ring movement/rotation.

Figure 4:
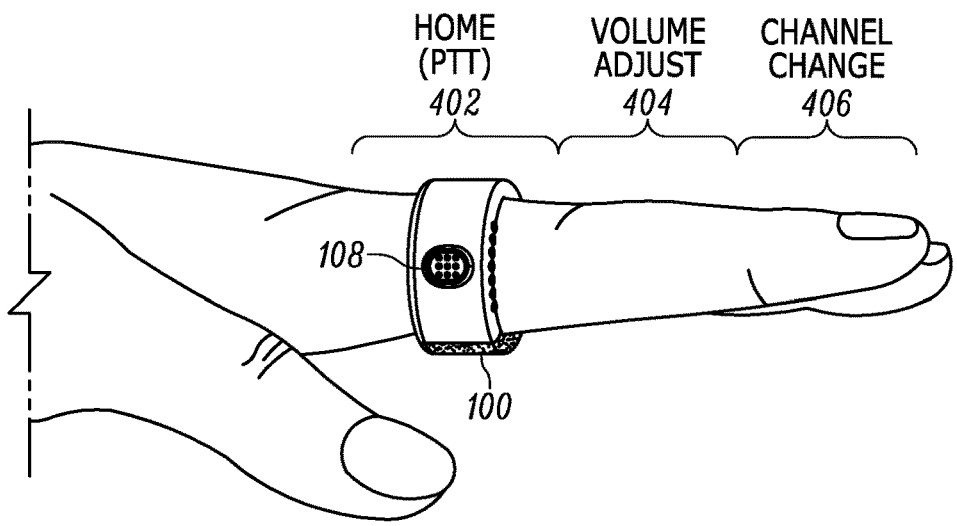
FIG. 4 shows additional details of the smart ring operating in accordance with various embodiments.

FIG. 4 shows smart ring 100 additional detail of smart ring 100 operating in accordance with some embodiments. For example, smart ring 100 placed on an index finger operating in a radio mode embodiment such as the LMR radio 240 of FIG. 2. The ring finger of the user is shown as having three segment areas over which fingerprints can be scanned, segment 1, segment 2, and segment 3. Placing the smart ring at the first finger segment identifies an authorized user and enables a PTT function, based on comparisons with pre-stored scanned prints, the ring sets up connectivity with the LMR radio over a PAN network.

The specific mode and functions for that mode have been pre-stored within the smart ring 100. The specific mode is determined based on the finger identification (here index finger for radio mode, and segment location for function). When smart ring 100 is located on segment 1 of the index finger, a first control function 402 is enabled. Here, when button 108 of smart ring 100 is pressed, a PTT function of the radio 240 is enabled.

In accordance with the various embodiments, moving the smart ring 100 to the segment 2 position, a second function 404, in this case volume adjust, can be controlled. The smart ring 100 can also be rotated at 404 at the segment 2 location, for varying the volume.

By moving the ring to the segment 3 position, a third function 406, in this case channel change, can be controlled. The smart ring 100 can also be rotated at 406 at the segment 3 location, for changing the channel.

Figure 5:
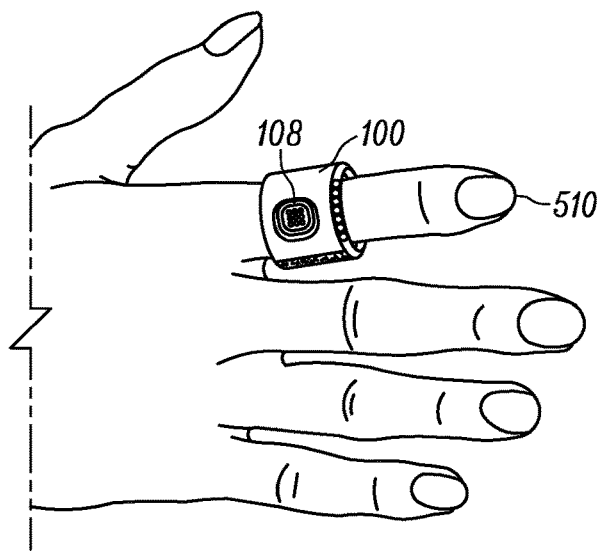
FIGS. 5, 6, and 7 show additional views of the smart ring of FIG. 1 being worn and operated on different fingers and different finger segments in accordance with various embodiments.
Figure 6:
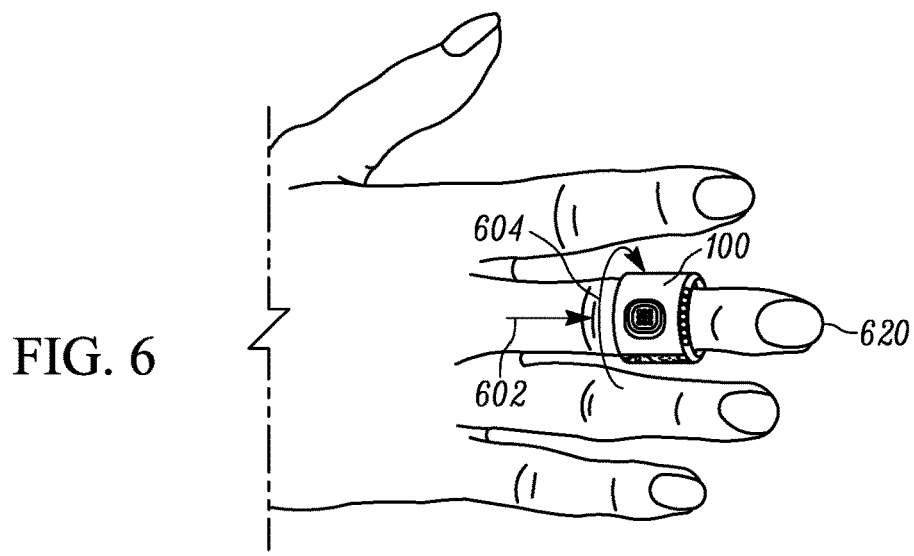
Figure 7:
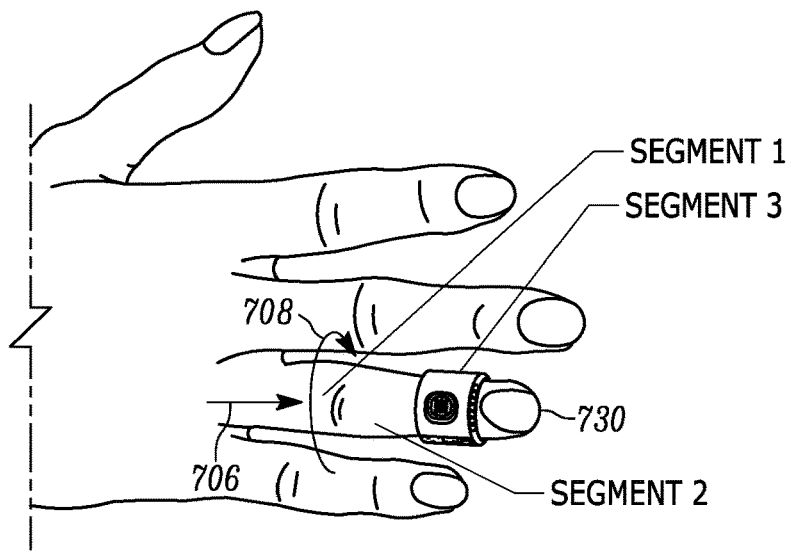

FIGS. 5, 6, and 7 shows additional views of the smart ring of FIG. 1 being worn and operated in accordance with various embodiments. FIG. 5 shows smart ring 100 worn on an index finger 510 at a first segment location in accordance with various embodiments. A scan at this segment location of index finger 100 verifies if a pre-stored scan matches the current user print scan. Upon a match taking place, the smart ring 100 enables a pre-stored mode such as a smart phone mode, and the button 108 controls a pre-stored function, such as a text-to-voice function.

FIG. 6 shows another view of the smart ring of FIG. 1 worn on a middle finger 620 at a second segment location in accordance with various embodiments. For example, in response to a scan being taken of this first segment of middle finger 620. Smart ring 100 then verifies whether a pre-stored scan matches the current user fingerprint scan for this first segment location of the middle finger. In response to a match, the smart ring enables a pre-stored mode, such as a body worn camera mode, and the button 108 controls a shutter function of the body worn camera. Sliding 602 the smart ring 100 to a second segment location, enables another function of the body worn camera, for example a video function. In accordance with the various embodiments, a variable function can be controlled via rotation 604 of the smart ring 100. Rotation is detected by movement of the smart ring 100 and images of fingerprints being scanned on the interior sensor 106 during such movement. The scanned prints saved to memory include images that reflect rotation and thus allow for comparison with prints that reflect rotation. Accordingly, rotation of smart ring 100 in this example embodiment, results in a zoom in/zoom out variable control of the video control. Hence, the smart ring 100 having, proper scan match, is able to enable functions (shutter) and control variable functions (zoom) of the body worn camera.

FIG. 7 shows the smart ring of FIG. 1 worn on a ring finger 730 at a third segment location in accordance with various embodiments. For example, a scan is taken of the first segment of ring finger 730, and smart ring 100 verifies whether a pre-stored scan matches the current user fingerprint scan for this first segment location of the ring finger. In response to a match, the smart ring enables a pre-stored mode and function, such as radio mode, and channel change. Accordingly, smart ring 100 now provides for and controls an expanded three levels of channel change. Rotation of the smart ring 100 at a first segment 1 location controls a first range of channels 1-10, sliding smart ring 100 to the second segment 2 location controls a second range of channels 11-20, and sliding smart ring 100 to the third segment location controls a third range of channels 21-30. Hence, smart ring 100 can advantageously be used over three finger segments of a single finger for a single function to provide a user with expanded functional control.

Figure 8:
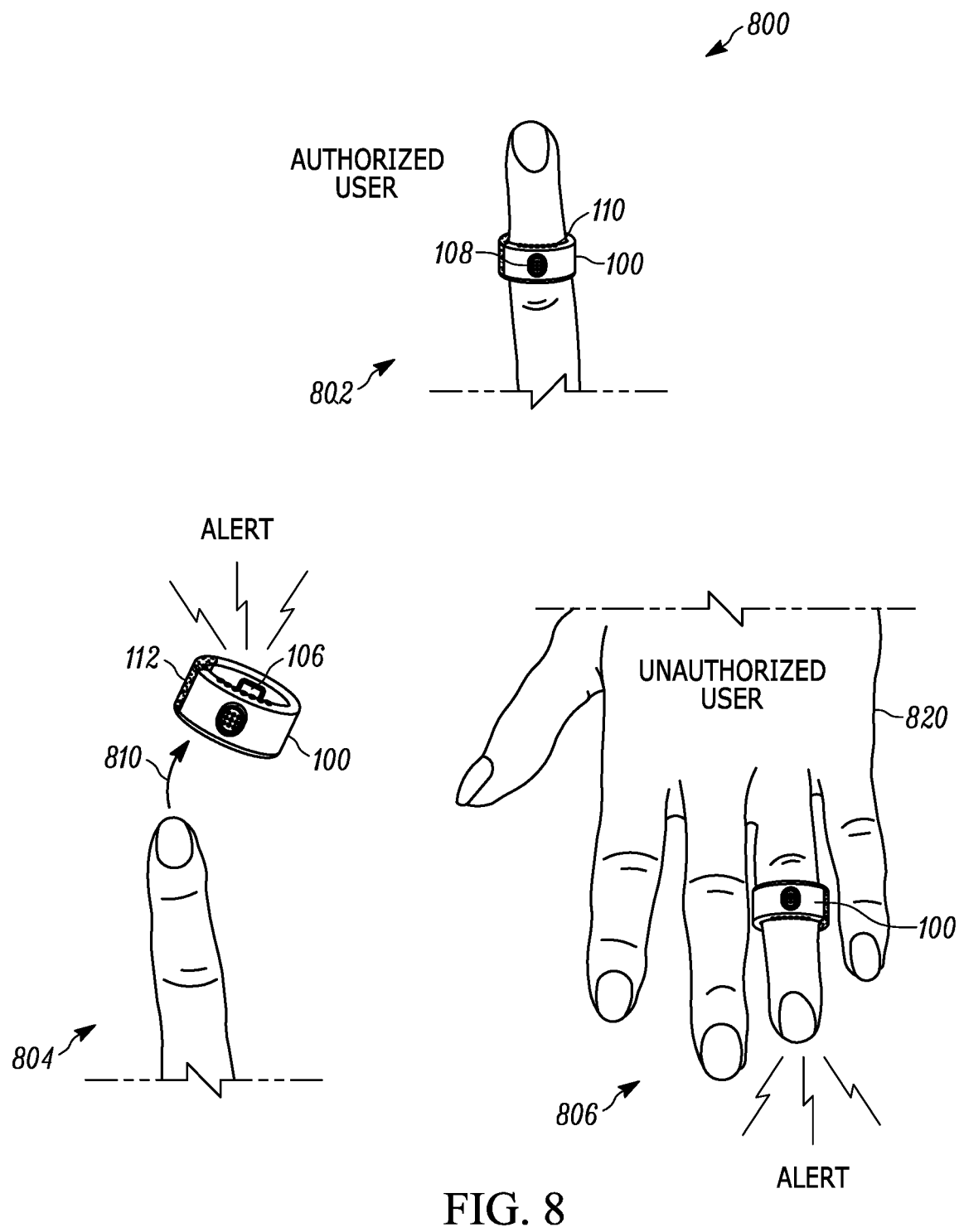
FIG. 8 shows examples comparing normal operation of the smart ring of FIG. 1 with various emergency alert embodiments.

FIG. 8 shows an example of the smart ring of FIG. 1 operating in accordance with various emergency alert embodiments 800. In view 802, the smart ring 100 having button 108 and LEDs 110 is shown operating normally on a finger of an authorized user. Moving to view 804, removal 810 of the smart ring 100, whether by accident or force, without the use of predetermined shutdown techniques, triggers an alarm alert via the LEDs 110, putting the smart ring 100 into a lock-down mode in which the finger identification and finger segment location identification functions are disabled. Other alarm alerts may also be implemented within smart ring 100, such as audio alarm alerts, and triggered in response to the smart ring being removed without appropriate shutdown techniques. Other examples of smart ring 100 alert instructions include, but are not limited to, sending an instruction to a radio to transmit an emergency signal to a base station, ring instruction to the radio to send 911 notification, ring instruction to the radio to turn on a speaker with a loud alert tone, to name a few.

Hence, in accordance with the various embodiments, removal of the smart ring 100 without a predetermined shutdown technique puts the smart ring into an appropriate lock-down mode and triggers an alarm alert. The predetermined shutdown techniques may include pressing the smart ring button 108 in a predetermined sequence, in conjunction with entering a code on a device or some combination of predetermined sliding and rotation for individual users.

In accordance with various embodiments, audible alert notifications sent by the smart ring 200 as part of the lock down procedure may be picked up by other devices within the communication system 200, or other nearby systems. Devices such as the radio 240 which are typically connected into larger systems are then more likely to become aware of potential issues being faced by a fellow officer through the audible alerts.

Moving to view 806 an unauthorized user's hands are shown. Regardless of which finger or which finger segment, the unauthorized user attempts to wear the smart ring 100, the smart ring will not operate. Firstly, when the smart-ring is in lock-down mode it cannot be enabled except by an authorized user. Secondly, even if the smart ring 100 were to become enabled none of the prints anywhere on an unauthorized user's fingers would match to any pre-stored prints within the smart ring's memory.

Figure 9:
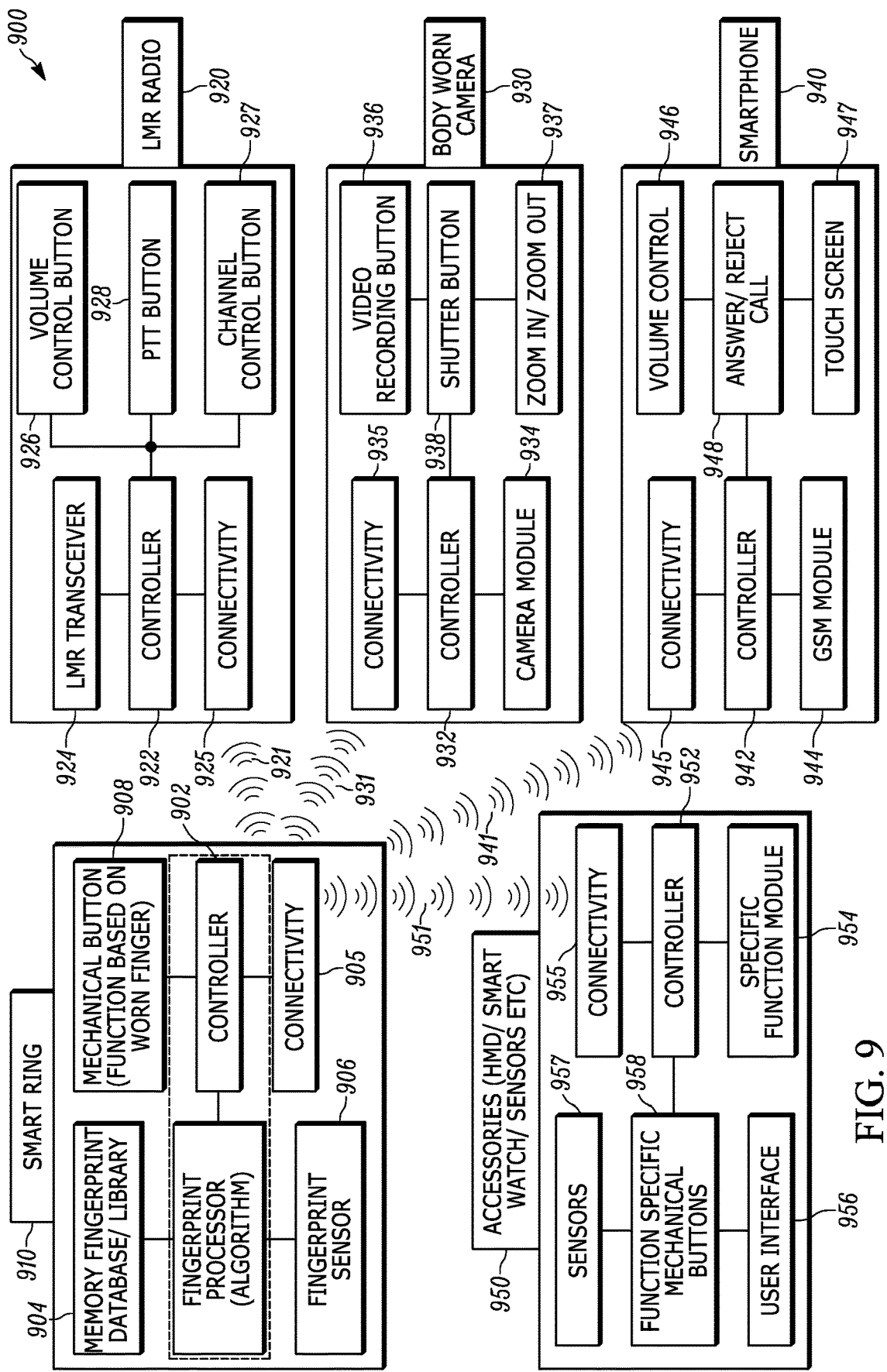
FIG. 9 is a block diagram of a communication system comprising a plurality of communication devices one of which includes the smart ring formed and operating in accordance with various embodiments.

FIG. 9 is a communication system 900 a plurality of communication devices formed and operating in accordance with various embodiments. At least one of the plurality of communication devices comprises a smart ring 910 formed and operating in accordance with the various embodiments to control at least one control function of at least one other communication device within the plurality of communication devices over a PAN network. In communication system 900, the plurality of communication devices, by way of example, comprise, a radio 920, a camera 930, a smart phone 940, and could further comprise other accessories 950. Each of the plurality of communication devices 920, 930, 940, 950 is a battery operated device providing various functions such as those utilized by public safety personnel in day-to-day activities under control of their respective controllers. In accordance with the various embodiments, smart ring 910 comprises a controller 902 controlling a fingerprint processor algorithm for comparing fingerprints sensed by a fingerprint sensor 906 with pre-stored fingerprints stored in a memory 904. Memory 904 provides a database library of pre-stored fingerprints of authorized users. The database library contain prints taken along all portions of an authorized user's fingers, such that the fingerprint processor algorithm is able to take a scan taken by the smart ring 910 at a side segment portion and locate a match for that portion, if it exists, in the database. If a match occurs, the identification of finger and finger segment allows for a predetermined device of the plurality of communication devices to have a predetermined function controlled by the smart ring 100.

Each of the plurality of PAN devices will be described in terms of an example embodiment, but with the understanding that the embodiments of the invention are not limited to these devices nor to the specific position of the smart ring to particular finger/finger segment assignments. In accordance with the various embodiments, the smart ring 910 can be adapted for different users by saving different prints into the memory 904 fingerprint database library and associating those prints with the connectivity of PAN devices utilized by each user/officer. The fingerprint sensor 906 can further scan prints for different fingers and segments and these positions can be saved in memory for each individual officer in a customized manner. Thus, officers with smaller hands who may want to control, say volume using a different finger segment may do so, as the smart ring 910 has been identified for their own use.

Each of the plurality of communication devices further comprises PAN connectivity modules, such as smart ring connectivity module 905, radio connectivity module 925, body worn camera connectivity module 935, smart phone connectivity module 945, and accessory(s) connectivity module(s) 955. In some embodiments, the smart ring 910 may be enabled, powered on, when the smart ring 100 is put on by the user, and the print scanner 906 detects a print input at the scanner, pre-authorization. In other alternative embodiments, a dedicated on/off may be used, or a long press of the mechanical button 908 may be used. Hence, a variety of on/off approaches to enable the smart ring 100 can be utilized. Once the smart ring 100 is enabled, the plurality of devices are simultaneously connected over the PAN. For the purposes of this application, connectivity between the smart ring 910 and the selected device to be controlled is achieved over the personal area network (PAN) using a wireless low-powered PAN, also referred to as WPAN carried over a short-distance wireless network technology such as: INSTEON, IrDA, Wireless USB, Bluetooth, Wifi, Z-Wave, ZigBee, and Body Area Network (BAN), to name a few. The reach of the PAN varies from a few centimeters to a few meters and thus is well suited for body-worn devices, dash mounted devices, handle bar mounted devices and the like. Although, the plurality of devices are all connected over the PAN simultaneously, the smart ring 100 control over an individual device/function is represented via signal designators 921 to designators 931, 941 and 951 (which are not simultaneous). Hence, the smart ring 100 is able to send an instruction to a single PAN device to which the instruction is intended to go to. In other words, the smart ring 100 is able to selectively send, based on the scan match, the predetermined instruction to a predetermined device via an individual PAN connectivity signal, such as 921 or 931 or 941 or 951.

Example of Smart Ring 100 Controlling a Function of LMR Radio 920 in System 900

The radio 920 is a two-way radio, such as a land mobile radio (LMR), operating in a public a safety communications system. Radio 920 comprises a controller 922, an LMR transceiver 924 for narrowband communications such as those used in public safety. Radio 920 further comprises a volume control button 926, a push-to-talk (PTT) button 928, and a channel control button 927. The volume control button 926, PTT button 928, and channel control button 927, all control radio functions which, under some environments, for example, undercover operations, an officer might find beneficial to control via the smart ring 100.

Radio 920 thus provides for certain predetermined control functions to be controlled over a PAN network, by smart ring 100, via wireless PAN connectivity 921, such as volume control button 926, push-to-talk button 928, and channel control button 927. In accordance with the various embodiments, LMR radio 920 further comprises PAN connectivity module 925.

In accordance with the various embodiments, smart ring 910 upon authorized match of a user's finger identification and finger segment location to pre-stored fingerprint information stored in ring memory 904, enables smart ring to control a predetermined function of the LMR radio 920. In the LMR embodiment, pressing the button 908 of the smart ring 910 while positioned, for example, upon an index finger of an authorized user, at a first finger segment, enables PTT of the LMR radio 920.

Other predetermined LMR radio control functions, such as volume control 926 can be achieved by sliding the smart ring 910 along the user's finger to different segments. For example, the volume control 926 can be enabled by smart ring 910 by sliding the smart ring to a second finger segment of the index finger and rotating the smart ring 910, clockwise or counterclockwise, to adjust the LMR volume up and down.

LMR channel control 928 can be enabled by sliding the smart ring 910 to another appropriate finger segment, such as a third segment of the index finger, and rotating the smart ring 910, clockwise and counterclockwise, to adjust the LMR channel control 928 up and down.

Example of Smart Ring 100 controlling a function of Body Worn Camera 930 in System 900

Body worn camera 930 comprises a controller 932, a camera module for photography and video applications, and control functions comprising: zoom-in/zoom-out control 937, shutter button control 938, and video recording enable button 938. In accordance with the various embodiments, body worn camera 930 further comprises PAN connectivity module 935.

In accordance with the various embodiments, smart ring 910 upon authorized match of a user's finger identification and finger segment location to pre-stored fingerprint information stored in memory 904 enables a body worn camera mode which allows smart ring 930 to control certain predetermined functions of the body worn camera 930. In this embodiment, pressing the button 908 of the smart ring 910, while the smart ring 100 is positioned on, for example, a middle finger of the authorized user, at a first finger segment, enables camera shutter control 938 of body worn camera 930.

Sliding the smart ring 910 to a second appropriate finger segment of the middle finger provides the smart ring with additional variable control via clockwise and counterclockwise rotation. The detection of motion by the fingerprint sensor 106 of smart ring 910 in the clockwise and counterclockwise rotation provides zoom in/zoom out control for the camera module 934. The smart ring button 908 may still operate as a shutter button to take a photo of the zoom-adjusted subject matter.

Detection of motion, sliding, by the sensor 906 by the smart ring 910 to a third appropriate finger segment of the middle finger, changes the control of the smart ring button 908 to that of a video recording button 938. Then sensing the clockwise and counterclockwise rotation of smart ring 910 at the third finger segment of the middle finger provides zoom in/zoom out control 937 of the video recording.

Example of Smart Ring Controlling a Function of a Smart Phone in System 900

Smart phone 940 comprises a controller 942, a GSM module 944 for location applications, and control functions comprising: answer/reject call 948, volume control 946 and touch screen control 947. In accordance with the various embodiments, smart phone 940 further comprises PAN connectivity module 945.

In accordance with the various embodiments, smart ring 910 upon authorized match of a user's finger identification and finger segment location to pre-stored fingerprint information stored in memory 904, enables a predetermined function of the smart phone. Smart phone 940 may be worn on the body on a carry case or pocket, mounted on handle bars of a bicycle or dashboard of a vehicle within the PAN network.

In this example embodiment, pressing the button 908 of the smart ring 910 while positioned on, for example an index finger of a user, at a first finger segment, enables, smart phone function answer/reject call 948.

Sliding the smart ring 910 to a second appropriate finger segment of the index finger further provides variable volume control for an answered call, via clockwise rotation and counterclockwise rotation.

Sliding smart ring 100 to another segment on the finger enables, via PAN connectivity 941, a GSM module function 944, wherein rotation of the smart ring 100 at that same segment location, further provides touch screen control 947 to facilitate usage of the GSM application of smart phone 940.

Example of Smart Ring Controlling Accessories (HMD, Smart Watch, Sensor, ETC) in System 900

Accessories 950 comprise appropriate respective controller(s) 952 for controlling specific function module(s) 954 via user interface 956, sensor(s) 957, and mechanical buttons 958. In accordance with the various embodiments, the specific control function of accessories(s) 950 are controllable by smart ring 910 upon appropriate authorization.

In accordance with the various embodiments, smart ring 910 upon authorized match of a user's finger identification and finger segment location to pre-stored fingerprint information stored in memory 904, enables wireless PAN connectivity 951 to connectivity module 955 of a variety of PAN accessory devices 950, thereby providing the capability to add-on predetermined functions associated with those accessories control those functions with the smart ring 910 and remove them as desired. The plurality of PAN accessories 950 may be worn on the body, in a carry case or pocket, mounted on handle bars of a bicycle or dashboard of a vehicle and operate within the PAN network. Accessories which have a user interface 956, whether mechanical via mechanical button(s) 958, sensor(s) 957, or other specific control function module(s) 958 under the control of a controller 952 and which further have PAN connectivity 955 are all good candidates for having those functions managed via the smart ring 910 over PAN connectivity 951. For example, a heads up display, a smart watch, and sensor devices for body biometrics and the like are all good candidates for having some of their function being controlled via the smart ring 910 in accordance with the various embodiments.

While the example embodiments of system 900 have been described in terms of connectivity from the smart ring 910 to each PAN device through individual PAN connectivity 921, 931, 941, 951, in accordance with alternative embodiments, the smart ring 910 can connect over the PAN to a single device, for example to radio 940, operating as a main hub. This main hub can then communicate control instructions sent by the smart ring 910 to the rest of the plurality of PAN devices. For example, smart ring 910 can instruct radio 940 to take a photo by the body worn camera 930, then radio 940 instructs the body worn camera 930 to take a photo, then the camera takes the photo.

A few non-limiting examples of functions that can be well controlled via rotation are provided below:
  i) Volume function (radio/smartphone mode): Increase/reduce the volume level
  ii) Channel function (radio/smartphone mode): Change channel
  iii) Zoom function (Camera/Video mode): Zoom in/Out the picture/video
  iv) Fast-forward/backward function (Video mode)
  v) Scroll up/down (HMD/radio/smartphone mode): Scroll up/down a menu
  vi) Change page (HMD/radio/smartphone mode): Change the page of a menu vii) Display intensity (HMD/radio/smartphone mode): Change display intensity
viii) Display/User Interface/Text/Notification Size (HMD/radio/smartphone mode)

A few non-limiting examples of functions that can be well controlled via sliding from finger segment to finger segment without the need for rotation are provided below:

Without rotation—Sample examples:
i) Mode and function: different fingers enabling different device modes and different segment locations along each finger enabling different functions
Sample examples:
Camera Mode: index finger: $1^{st}$ segment OFF, $2^{nd}$ segment camera function enabled/button press, and $3^{rd}$ segment video enabled/button press
Radio Mode: middle Finger: 1st, $2^{nd}$ and $3^{rd}$ segments provide different channel/zone functions.
ii) Environmental functions:
Quiet vs Noisy environment: control audio loudness of device by sliding ring from one finger segment to another
Indoor vs Outdoor: control display intensity by sliding ring from one finger segment to another thereby controlling the device over the PAN such that display intensity goes from one level to another.
iii) Different operating Modes per Finger for one Device
Device operates in Normal Mode when smart ring worn at index finger, Device operates in Covert Mode (e.g. a display camouflage enabled) when smart ring worn at middle finger, Device operates in Silent Mode when smart ring worn at ring finger (e.g. vibrate call alerts enabled).

In accordance with the various embodiments, combinations of press-button, slide, and rotation can be appropriately combined to best suit using the control ring 910 to remotely control a variety of devices worn on the body or located close to the body.

Referring briefly to the Smart Phone Device 940, in some situations a user may wish to use the smart ring 910 to enable a special smart phone mode 940 so as to control a very large number of different smart phone functions. In this embodiment, it can be beneficial to dedicate the user's pre-stored prints of all the finger segment locations to the large number of different smart phone functions. In other words, all fingers, all segments, and rotation can be dedicated to controlling functions of one device, if desired. This special smart phone mode can later be changed back to just a few default functions, such as volume control and touch screen. Depending on a user's desired application for the smart ring 100, examples of functions for the Smart Phone may include but are not limited to:

Smart Phone Mode Functions Examples:
Operating State: Silent, Covert, Loud, Vibrate
Messaging/Email: Press button will trigger text-to-voice notification
Date/Time: One position will read out date, one position will read out time
Reply to message with standard pre-stored reply template: press button to indicate reply message, rotate to select the pre-stored template message, select and send upon button press.
Password: use predetermined slide/push/rotate/sequence to unlock the phone.
Calendar: Rotate: to read out calendar meeting/action items/agenda, scroll through the action items
Contacts: Rotate to scroll through contacts and call Examples for a device to be Smartphone controlled when mounted at certain place (e.g. vehicle dashboard, workplace phone stand):
wake up the phone screen
change the phone brightness (e.g. change weather or lightning
scrolling on text
scrolling on icons
select icons remotely
scroll through gallery (photo album) remotely
GPS/location app control
On or Off flashlight on smartphone
snap a photo/video Accordingly, there has been provided a smart ring 100 suitable for controlling and supporting expanded functionality of devices within a PAN network, a VAN network and/or combinations thereof. An individual wearing the smart ring 100, such as a police officer or other public safety person, is now advantageously able to manage a plurality of devices, worn on or proximately located around the user, and is further able to control various functions associated with those devices. Additional safety alerts and features can be provided to protect against loss or unauthorized usage.

The utilization of the inner ring surface for fingerprint scan to discriminate different user fingers and finger segments to enter different modes and supporting multiple PAN devices provides a significant advantage over, for example, finger gesture pointer navigation type systems.

The ability to detect the ring location and movement of the ring through fingerprint scanning provides a highly reliable and accurate system with expanded control. The smart ring and communication in which smart ring is incorporated provided by the various embodiments avoids the use of capacitive touch sensing, inertia sensing (gyroscope, accelerometer etc), of past devices, thereby overcoming issues of false triggering and limited functionality associated with such approaches.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A personal area network (PAN) control device, comprising:
    a smart ring having a fingerprint sensor integrated on an interior surface, the fingerprint sensor identifying ring position based on identifying upon which finger and which finger segment the smart ring is being worn;
    a memory located within the smart ring, the memory having pre-stored fingerprint information stored therein; and
    a controller coupled to the memory and fingerprint sensor within the smart ring, the controller enabling a predetermined PAN control function in response to the identified finger and finger segment matching the pre-stored fingerprint information, wherein the smart ring further provides variable control of the enabled PAN control function via at least one of:
        rotation of the smart ring;
        sliding of the smart ring to different segment locations;
        rotation of the smart ring and sliding of the smart ring, wherein rotation of the smart ring controls the variable control function and sliding of the smart ring to a different segment expands the control function so that rotation at a new segment provides expanded variable control.

2. The PAN control device of claim 1, wherein the memory has finger location and fingerprint segment information for at least one of: thumb, index finger, middle finger, fourth finger, and outer finger of one or both hands of pre-authorized users stored therein.

3. The PAN control device of claim 1, wherein the memory has finger location and fingerprint segment information for each thumb, index finger, middle finger, fourth finger, and outer finger of one or both hands of pre-authorized users stored therein.

4. The PAN control device of claim 1, wherein the wearable ring further comprises a push-button on an exterior surface.

5. The PAN control device of claim 1, wherein a non-match to the pre-stored match pre-stored fingerprint information triggers an emergency LED alert function indicative of an unauthorized user.

6. The PAN control device of claim 1, wherein the smart ring comprises an adjustable flex portion for sizing.

7. A portable communication system, comprising:
    a plurality body-wearable personal area network (PAN) devices, at least one of which comprises a smart ring; and
    the smart ring, comprising:
        a controller;
        a sensor coupled to the controller, the sensor sensing fingerprint information for finger identification and finger segment location of a finger worn smart ring, and
        the controller selectively enabling a predetermined function from a plurality of pre-stored functions for a device of the plurality of PAN devices, based on identification of the finger and finger segment location of the smart ring,
        wherein the smart ring further provides variable control of the predetermined function of the selected device, and the variable control is provided by at least one of:
            rotation of the smart ring at the finger segment location;
            sliding the smart ring to a different finger segment location, without rotation of the smart ring;

sliding the smart ring to a different finger segment location along with rotation of the smart ring at each different finger segment location.

8. The portable communication system of claim 7, wherein the plurality of pre-stored functions which are controllable by smart ring rotation, comprise one or more of:
increase/decrease volume;
channel up/down;
zoom-in/zoom out;
fast-forward/fast-reverse;
scroll up/down menu;
change page menu;
increase and decrease display intensity;
display intensity; and
user interface character size on display.

9. The portable communication system of claim 7, wherein the plurality of pre-stored functions which are controllable by different finger segment locations of the smart ring, without smart ring rotation, comprise one or more of:
camera and video at two segments;
channel/zone function at three segments;
indoor display intensity and outdoor display intensity at two segments;
audio loudness for quiet environment and audio loudness for noisy at two segments;
light OFF and light ON at two segments.

10. The portable communication system of claim 7, further comprising:
a light emitting diode (LED) coupled to the smart ring; and
the LED indicating an emergency alert indicative of an unauthorized user in response to the sensor sensing fingerprint information not matching pre-stored fingerprint information stored.

11. The portable communication system of claim 7, wherein removal of the smart ring without a predetermined shutdown of the smart ring puts the smart ring in a lockdown mode and triggers an alarm alert.

12. The portable communication system of claim 7, wherein the smart ring is adjustable via an elastic material.

13. The portable communication system of claim 7, wherein the smart ring detects a thumb, an index finger, a middle finger, a ring finger and a little finger to provide a different control function for a different PAN device of the plurality of PAN devices, and the smart ring senses each finger segment of each thumb, index finger, middle finger, ring finger and little finger to provide variable control via rotation of the smart ring.

14. A personal area network (PAN) control device, comprising:
a smart ring having a fingerprint sensor integrated on an interior surface, the fingerprint sensor identifying ring position based on identifying upon which finger and which finger segment the smart ring is being worn;
a memory located within the smart ring, the memory having pre-stored fingerprint information stored therein, wherein the memory has finger location and fingerprint segment information for at least one of: thumb, index finger, middle finger, fourth finger, and outer finger of one or both hands of pre-authorized users stored therein; and
a controller coupled to the memory and fingerprint sensor within the smart ring, the controller enabling a predetermined PAN control function in response to the identified finger and finger segment matching the pre-stored fingerprint information.

15. A personal area network (PAN) control device, comprising:
a smart ring having a fingerprint sensor integrated on an interior surface, the fingerprint sensor identifying ring position based on identifying upon which finger and which finger segment the smart ring is being worn;
a push-button on an exterior surface;
a memory located within the smart ring, the memory having pre-stored fingerprint information stored therein; and
a controller coupled to the memory and fingerprint sensor within the smart ring, the controller enabling a predetermined PAN control function in response to the identified finger and finger segment matching the pre-stored fingerprint information.

16. A personal area network (PAN) control device, comprising:
a smart ring having a fingerprint sensor integrated on an interior surface, the fingerprint sensor identifying ring position based on identifying upon which finger and which finger segment the smart ring is being worn;
a memory located within the smart ring, the memory having pre-stored fingerprint information stored therein; and
a controller coupled to the memory and fingerprint sensor within the smart ring, the controller enabling a predetermined PAN control function in response to the identified finger and finger segment matching the pre-stored fingerprint information, wherein a non-match to the pre-stored fingerprint information triggers an emergency LED alert function indicative of an unauthorized user.

17. A personal area network (PAN) control device, comprising:
a smart ring having a fingerprint sensor integrated on an interior surface, the fingerprint sensor identifying ring position based on identifying upon which finger and which finger segment the smart ring is being worn;
an adjustable flex portion for sizing;
a memory located within the smart ring, the memory having pre-stored fingerprint information stored therein; and
a controller coupled to the memory and fingerprint sensor within the smart ring, the controller enabling a predetermined PAN control function in response to the identified finger and finger segment matching the pre-stored fingerprint information.

18. A portable communication system, comprising:
a plurality body-wearable personal area network (PAN) devices, at least one of which comprises a smart ring; and
the smart ring, comprising:
a controller;
a sensor coupled to the controller, the sensor sensing fingerprint information for finger identification and finger segment location of a finger worn smart ring;
the controller selectively enabling a predetermined function from a plurality of pre-stored functions for a device of the plurality of PAN devices, based on identification of the finger and finger segment location of the smart ring; and
the smart ring providing at least one alert comprising:
a light emitting diode (LED) coupled to the smart ring, the LED indicating an emergency alert indicative of an unauthorized user in response to the sensor sensing fingerprint information not matching pre-stored fingerprint information stored; and an alarm alert which puts the smart ring in a lockdown mode, the alarm alert being triggered in response to removal of the smart ring without a predetermined shutdown of the smart ring.

19. The PAN control device of claim 14, wherein the smart ring further provides variable control of the enabled PAN control function via rotation of the smart ring.

20. The PAN control device of claim 14, wherein the smart ring further provides variable control of the enabled PAN control function by sliding the smart ring to different segment locations.

21. The PAN control device of claim 14, wherein the PAN control function is a variable function and rotation at of the smart ring controls the variable control function and sliding of the smart ring to a different segment expands the control function so that rotation at the new segment provides expanded variable control.

22. The portable communication system of claim 18, wherein the smart ring further provides variable control of the predetermined function of the selected device, and the variable control is provided by rotation of the smart ring at the finger segment location.

23. The portable communication system of claim 18, wherein the smart ring provides variable control of the predetermined function of the selected device, and the variable control is provided by sliding the smart ring to a different finger segment location, without rotation of the smart ring.

24. The portable communication system of claim 18, wherein the smart ring provides variable control of the predetermined function of the selected device, and the variable control is provided by sliding the smart ring to a different finger segment location along with rotation of the smart ring at each different finger segment location.

* * * * *